Inventor:
PETER SEYL
By Hane and Nyrich
ATTORNEYS

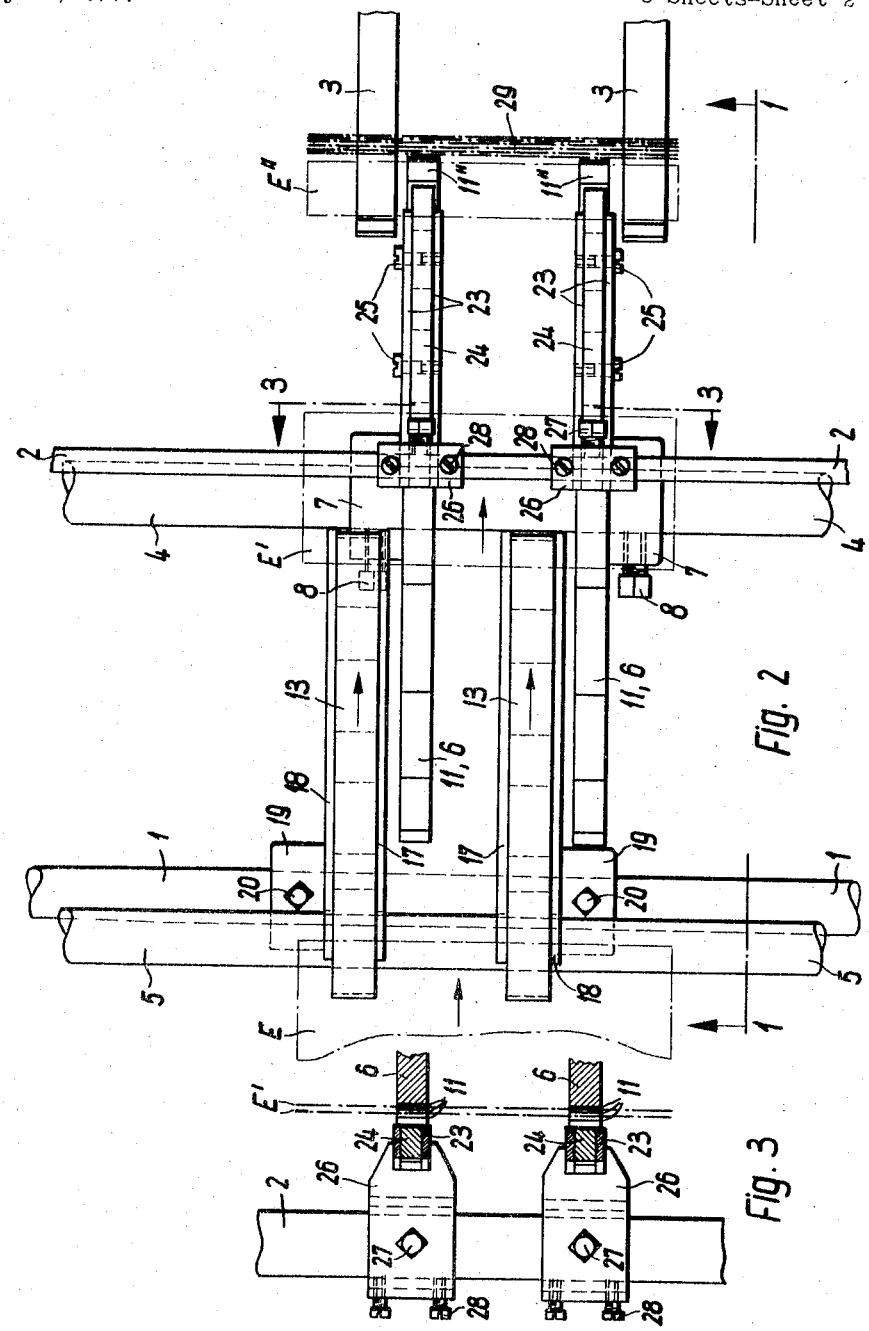

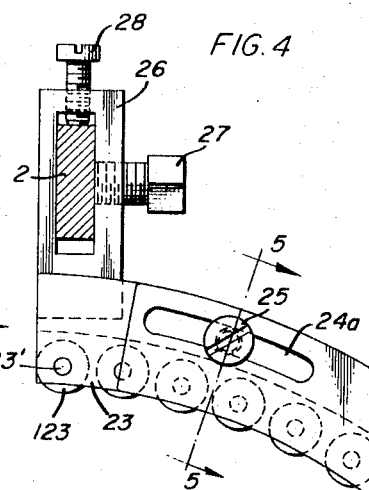
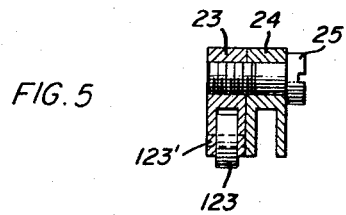
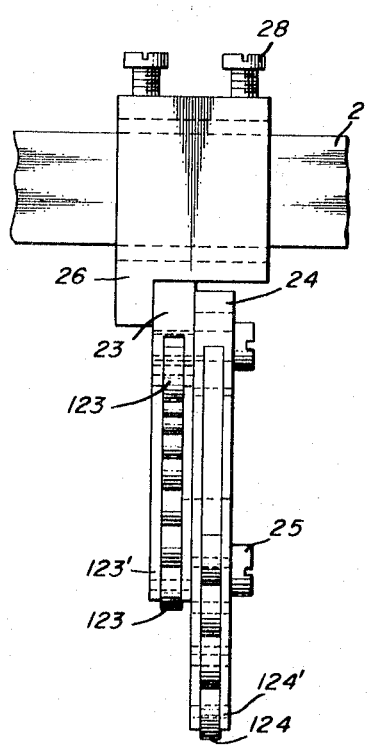
INVENTOR.
PETER SEYL

United States Patent Office 3,355,169
Patented Nov. 28, 1967

3,355,169
DEVICE FOR DISTRIBUTING WORK PIECES
Peter Seyl, Irlich, Rhineland, Germany, assignor to Richard Winkler, Neuwied, and Kurt Dunnebier, Gladbach, Germany
Filed July 15, 1965, Ser. No. 472,110
Claims priority, application Germany, Sept. 19, 1964, W 37,579
10 Claims. (Cl. 271—71)

ABSTRACT OF THE DISCLOSURE

A distributing device for delivering envelopes, etc. from a supply station to a receiving station by feeding the envelopes and other work pieces to the device at a rate of feed which is higher than that of a comparatively slow rotating distributor disc, and discharging the envelopes from the distributor disc in upright side-by-side arrangement. The device delivers the envelopes at the high feed speed into a plurality of pockets on the distributor disc, but slows down the envelopes in the pockets and before they are discharged from the disc.

---

The invention relates to a distributing device for delivering envelopes, flat bags, etc., referred to hereinafter collectively as work pieces, from a supply station to a receiving station. More particularly, the invention relates to a device in which the work pieces to be delivered are fed, one by one, to the device at a rate of feed which is higher than that of a comparatively slow rotating distributor disc or fan wheel of the device. The work pieces are discharged from the fan wheel either in upright or lying down row arrangement.

Fan wheels as now known have peripheral slots of uniform width which extend into the body of the wheel with a spiral curvature overlapping each other. Such fan wheels require a comparatively large space for feeding a given number of work pieces within a given unit of time and must be operated at a comparatively low delivery speed. They also require special and rather complex means for displacing delivered work pieces as they are discharged from the fan disc in the receiving station to provide adequate space for subsequently discharged work pieces.

It is an object of the invention to provide a novel and improved distributing device of the general kind above referred to, the disc of which is capable of distributing successive work pieces at a considerably higher rate of speed than was heretofore possible.

Another object of the invention is to provide a novel and improved distributing device of the general kind above referred to which can be operated at a high discharge speed per work piece without danger of damage to the work pieces distributed by the device.

Still another object of the invention is to provide a novel and improved distributing device of the general kind above referred to which does not require special and complex means for displacing discharged work pieces in the receiving station to make room for subsequently discharged ones.

The aforementioned objects, features and advantages of the invention and other objects, features and advantages which will be pointed out hereinafter are attained by providing a distributor disc, the peripheral wall of which mounts a plurality of circumferentially closely spaced leaf springs. Each of these springs is secured at one end to the peripheral edge of the disc and extends in a generally tangential direction so that each two adjacent springs define an outwardly widening pocket for receiving therein a work piece to be distributed. It has been found to be advantageous to provide arcuate guide means such as rollers or curved bars which coact with the leaf springs and bend the same after receiving work pieces in the aforedescribed pockets toward the peripheral edge of the rotating disc for part of a revolution thereof. These guide means release the leaf springs shortly before the same approach a discharge position in the receiving station. As a result, the work pieces are safely retained within the pockets until reaching the discharge position but are released at the correct moment for discharge from the pockets to be deposited side by side in upright position on angle bars in the receiving station. The release of the springs by the guide means is so timed that when the springs snap back into their normal outwardly oriented position, they will shift the accumulated row of deposited work pieces in the receiving station so that sufficient space is available for subsequent work pieces without requiring specific mechanically or otherwise controlled structural components for displacing the accumulated work pieces.

The arcuate guide means acting upon the leaf springs during part of each revolution of the distributor disc also effect a slowing-up of the work pieces as the same are fed into the pockets formed by the leaf springs. The extent of the slowing or braking of the work pieces may be selected in accordance with the weight and other properties of the work pieces, such as the type of paper used.

A distributor disc according to the invention provides space for at least 50 percent more pockets for a given diameter than fan wheels having spirally curved slots as heretofore known and the same diameter.

Due to the possibilty of accurately controlling the retardation of the work pieces when and while being fed into the pockets and the low velocity with which the work pieces are deposited in the receiving station as a result of the high number of pockets which may be provided in a disc of given diameter, the danger of damaging the work pieces when discharged is practically eliminated even if a high number of work pieces is processed per minute.

Any danger of damage to the work pieces is further reduced by the fact that the lower edge of the work pieces when it finally comes to rest upon the angle bars in the receiving station travels only a very short distance after leaving the respective pocket due to the approximately tangential orientation of the leaf springs in reference to the peripheral outline of the distributing disc.

The invention further provides that the effective length of the arcuate guide means is adjustable in accordance with the dimensions or shape of the work pieces to be distributed. The radial distance of the arcuate guide means in reference to the rotational axis of the distributor disc is also preferably adjustable to adapt the action of the guide means upon the leaf springs to the specific requirements of the work pieces to be processed such as dimensions and the gauge of the paper used. A sliding friction between the leaf springs and the guide means may be obtained by using curved bars and a rolling friction by using rollers coacting with the springs. Either type of guide means may be used, depending upon the specific requirements of the application.

The work pieces are individually and successively fed to the distributor disc by suitable transmission means, such as conveyor belt or link belt preferably coacting with spring loaded counter rollers. The transmission means, the arcuate guide means and the distributor table, or more specifically, a receiving frame thereon, are all displaceable, as in the direction of the rotational axis of the distributor disc to adapt the device to the dimensions and the shapes of the work pieces.

The invention will be more fully explained in connection with the accompanying drawing which shows by way of illustration and not by way of limitation a distributing device particularly suitable for the distribution of flat bags or envelopes.

In the drawing:

FIG. 2 is a plan view of the device, some of the components of the device being omitted for sake of clarity of illustration;

FIG. 3 is a sectional view taken on line 3—3 of either FIG. 1 or FIG. 2;

FIG. 4 is a detailed figure of a modification of the guide means of the device;

FIG. 5 is a section taken on line 5—5 of FIG. 4; and

FIG. 6 is a side view of FIG. 4.

Figure 1:
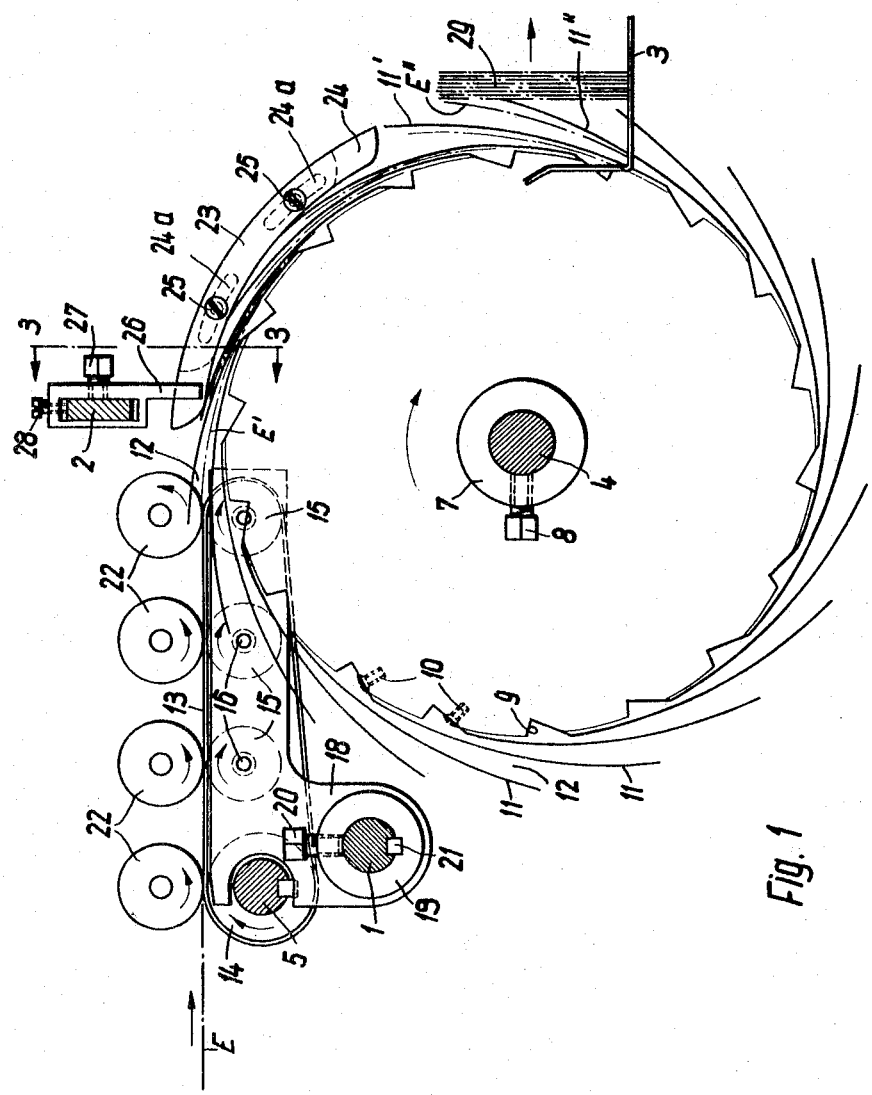
FIG. 1 is a diagrammatic elevational view, partly in section, taken on line 1—1 of FIG. 2.

Referring now to the figures in detail, the device comprises a round support bar 1 and a flat support bar 2 which should be visualized as being mounted at right angles on side walls of the frame structure of the machine in which the work piece to be distributed are produced. The side walls of the machine are not shown as they are not essential for the understanding of the invention. They are also used to support a distributor table in the receiving station. The table as such is not shown but merely indicated by two conventional angle bars 3 placed upon the table for receiving the deposited work pieces. The two bars are parallel and spaced by a distance less than the width of the work pieces to be deposited for a reason which will become apparent from the subsequent description.

The side walls of the frame structure should further be visualized as rotatably supporting shafts 4 and 5 which are rotated by suitable drive means of conventional design, such as chains and chain gears as a predetermined ratio of rotation which will be more fully explained hereinafter.

Shaft 4 supports two distributor discs 6 extending between angle bars 3 constituting support members. As it is evident, it is within the scope of the invention to provide only one disc or more than two. Each disc has a hub 7 secured on shaft 4 by one of several set screws 8. A plurality of leaf springs 11 are secured on one end to the peripheral rim of each disc 6 by suitable fastening means such as peripheral notches 9 and mounting screws 10. As can best be seen in FIG. 1, the free parts of the springs extend in an approximately tangential direction in reference to the rims of the discs so that an outwardly widening pocket 12 is defined between each two adjacent springs.

A conveyor 13, preferably a substantially slip-free endless belt, such as a belt with laid-in thin steel wires and teeth on the inside, is mounted closely adjacent to each disc. The conveyors are driven in the direction of the arrows. The drive for the conveyors is derived from shaft 5 to which a driving rolle 14 is keyed. The conveyors are further guided over rollers 15 seated on pins 16 which, in turn, are mounted on pairs of plates 17 and 18. Each of the conveyor belts 13 is guided between one pair of plates 17 and 18. The plates are secured on support bar 1 by means of a collar 19 fixedly secured to plate 18 and in turn secured to bar 1 by a set screw 20. Each pair of plates 17 and 18 is further secured against turning in reference to bar 1 by a key 21.

Preferably yieldably supported counter rollers 22 of a width less than the width of conveyor belts 13 are disposed above each of the conveyor belts and more specifically opposite rollers 14 and 15. The counter rollers 22 press the work pieces against the conveyor belts.

An arcuate guide means composed of two parts 23, 24 is provided for each distributor disc 6. As is clearly shown in FIG. 1, the guide means are so placed that they will depress leaf springs toward the respective disc when and while passing under the guide means so that work pieces fed into pockets 12 are retained therein with a sufficient friction. The effective length of the guide means is adjustable by lengthwise displacing the parts 23 and 24 thereof in reference to each other. Such displacement of the two guide parts can be readily effected by loosening and tightening respectively set screws 25 on guide part 23 engaged with elongated slots 24a in guide part 24, or vice versa. Each guide means 23, 24 is mounted on a holder 26 which is secured on flat support bar 2 by a screw 27. The radial distance of the arcuate means 23, 24 in reference to the rotational axis of shaft 4 may be adjusted by means of a set screw 28 which coacts with holder 26 in bar 2 as is clearly shown in FIG. 1.

The spacing of receiving angle bars 3 may be varied by displacing the same on the receiving table or other support in the same direction as the distributor discs 6 are displaceable on shaft 4 and plates 17, 18 together with conveyor belts on bar 2. Similarly, counter rollers 22 should be visualized as being displaceable in the same direction. Such adjustability of the coacting principal components of the device is desirable to permit an adaptation of the device tot he specific dimensions and shapes of the work pieces to be distributed.

The distributing device as hereinbefore described, operates as follows:

Work pieces E should be visualized as being individually and successively fed to the device in the direction of the respective arrow by travelling between conveyor belts 13 and counter rollers 22 coacting with the same. The work pieces are thus delivered, one by one, into successive pockets 12 formed between each two adjacent leaf springs 11. The feeding position is indicated at E'. The ratio of rotation between driving rollers 14 and distributor discs 6 is such that a vacant pocket 12 is always in juxtaposition to the delivery end of conveyor belts 13 and the last counter roller 22 just when a work piece reaches the feeding position E'.

As previously stated, the feeding speed with which the work pieces travel on the conveyor belt 13 is considerably higher than the circumferential rotational speed of the pockets formed by the springs. This excess velocity of the work pieces at the moment or rather just before the moment of being fed into a pocket is retarded or braked by the arcuate guide means 23 beginning to press down the springs already when the work piece is still in the position E'. As a result, the work piece is subjected to a considerable friction by being in contact with the two springs forming the respective pocket. The springs are held more or less completely closed until the lower edge of a work piece reaches the position E'', that is, just before the respective work piece comes into engagement with bars 3. At this moment, the free ends of the respective leaf springs are released by the guide part 24 of the guide means. The work piece lifted out of its pocket by bars 3 is now pushed by springs 11' against the backside of the stack 29 formed already on receiving angle bars 3 by previously deposited work pieces. At substantially the same time or very shortly before, the next proceeding spring 11'' has displaced the entire stack slightly in the direction of the respective arrow.

The feeding of the work pieces can, of course, be effected in many other ways and in a direction different from the illustrated one. The leaf springs may be straight instead of being curved. The adjustment means for varying the effective length of guide means 23, 24 and the radial spacing thereof from shaft 4 may be obtained in a manner different from the one illustrated. Similarly, the illustrated curved bars of the guide means may be replaced by an arcuate arrangement of rollers in a conventional manner.

While the invention has been described in detail with respect to a certain now preferred example and embodiment of the invention, it will be understood by those skilled in the art, after understanding the invention, that various changes and modifications may be made without departing from the spirit and scope of the invention, and it is intended, therefore, to cover all such changes and modifications in the appended claims.

FIGS. 4 to 6 show an arrangement in which the work pieces are guided along rollers to reduce the friction experienced by the work pieces such as envelopes while being guided along the guide means.

Arcuate guide part 23 mounts a plurality of rollers 123 rotatably on pins 123' mounted on the guide part. Similarly, arcuate guide part 24 mounts a plurality of pins 124' for rollers 124.

What is claimed is:

1. A device for delivering individual generally sheet-like work pieces from a supply station to a receiving station in upright side-by-side position, said device comprising a rotary disk continuously driven in a predetermined direction when the device is in operation, a plurality of leaf springs secured on one end to the periphery of said disk in circumferentially spaced and overlapping relationship, the free parts of said springs extending generally tangentially in reference to the disk and in opposition to the rotational direction thereof to define outwardly widening pockets open at the top and at the sides between each two adjacent springs, feed means for continuously feeding the work pieces, one by one, into successive pockets in frictional engagement with the inner wall surfaces thereof, operational stationary arcuate guide means, mounting means supporting said guide means adjacent to the periphery of said disk for engagement with the leaf springs thereon to limit the top openings of the pockets to a maximal radial width against the bias of said springs thereby controlling the frictional force experienced by the work pieces when entering the pockets, and stationary receiving means positioned to accumulate thereon in side-by-side upright position work pieces successively withdrawn from the open pockets, said receiving means including spaced apart support members straddling said springs thereon whereby portions of the work pieces protruding from the springs on opposite sides thereof are retained by the support members when the springs pass between the same.

2. A device according to claim 1 wherein said mounting means are adjustable to vary the radial distance between said arcuate guide means and the rotational axis of the disk for correspondingly varying the maximal width of the top pocket openings and thus the frictional force experienced by the workpieces when entering the pockets.

3. A device according to claim 2 wherein the leading end of said guide means as seen in the rotational direction of the disk terminates adjacent to said feed means.

4. A device according to claim 2 wherein the location of the trailing end of said guide means and the location of said support members are so correlated that said trailing end releases the free ends of the springs just before the leading edge of work pieces in the pockets is engaged by the support members.

5. A device according to claim 4 wherein said free spring ends upon being released are engageable with work pieces accumulated on said support members to displace such accumulated work pieces by spring action in a direction away from said disk.

6. A device according to claim 1 wherein the effective length of said guide means is adjustable for adapting the same to the dimensions of the work pieces to be accumulated.

7. A device according to claim 1 wherein said guide means comprise an arcuate guide bar stationarily mounted adjacent to the periphery of said disk, the side of said guide bar facing the disk slidably engaging and depressing said rotary leaf springs thereby maintaining the width of the top openings of the pockets at said maximal width.

8. A device according to claim 1 wherein said arcuate guide means comprises rollers engaging and depressing said rotary leaf springs thereby maintaining the width of said pocket openings at said maximal width.

9. A device according to claim 1 wherein said feed means comprise a continuously driven conveyor belt and counter-rollers coacting with the same, the speed of travel of said conveyor when feeding the work pieces into the pockets being higher than the circumferential rotational speed of the pocket openings.

10. A device according to claim 1 wherein said arcuate guide means, said feed means, and said receiving means are each mounted displaceable in the direction of the rotational axis of the disk.

References Cited

UNITED STATES PATENTS

| | | | |
|---|---|---|---|
| 2,599,442 | 6/1952 | Essex et al. | 271—82 X |
| 3,062,537 | 11/1962 | Hanstein et al. | 271—71 |

FOREIGN PATENTS

| | | |
|---|---|---|
| 597,109 | 8/1959 | Italy. |

M. HENSON WOOD, Jr., *Primary Examiner.*

ALLEN N. KNOWLES, *Assistant Examiner.*